(12) United States Patent
Araki et al.

(10) Patent No.: US 11,667,791 B2
(45) Date of Patent: Jun. 6, 2023

(54) ONE-PACK TYPE CURABLE SILICONE GEL COMPOSITION AND CURED SILICONE GEL

(71) Applicant: SHIN-ETSU CHEMICAL CO., LTD., Tokyo (JP)

(72) Inventors: Tadashi Araki, Annaka (JP); Hiroyasu Hara, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 3 days.

(21) Appl. No.: 17/628,352

(22) PCT Filed: Jul. 8, 2020

(86) PCT No.: PCT/JP2020/026634
§ 371 (c)(1),
(2) Date: Jan. 19, 2022

(87) PCT Pub. No.: WO2021/014970
PCT Pub. Date: Jan. 28, 2021

(65) Prior Publication Data
US 2022/0282090 A1 Sep. 8, 2022

(30) Foreign Application Priority Data
Jul. 25, 2019 (JP) .............................. JP2019-136760

(51) Int. Cl.
| | |
|---|---|
| *C08G 77/08* | (2006.01) |
| *C08L 83/06* | (2006.01) |
| *B01J 23/42* | (2006.01) |
| *C08G 77/14* | (2006.01) |
| *C08G 77/00* | (2006.01) |
| *C08J 3/075* | (2006.01) |
| *C08L 83/12* | (2006.01) |
| *C08L 83/04* | (2006.01) |
| *C08G 77/20* | (2006.01) |

(52) U.S. Cl.
CPC .............. *C08L 83/06* (2013.01); *B01J 23/42* (2013.01); *C08G 77/14* (2013.01); *C08G 77/70* (2013.01); *C08J 3/075* (2013.01); *C08L 83/12* (2013.01); *C08G 77/20* (2013.01); *C08J 2383/06* (2013.01); *C08L 83/04* (2013.01)

(58) Field of Classification Search
CPC .......... C08G 77/20; C08L 83/04; C08K 5/524
See application file for complete search history.

(56) References Cited

U.S. PATENT DOCUMENTS

| | | | |
|---|---|---|---|
| 4,256,616 A | 3/1981 | Hatanaka et al. | |
| 4,329,275 A | 5/1982 | Hatanaka et al. | |
| 6,300,455 B1 * | 10/2001 | Haselhorst ............. | C08K 5/526 528/31 |
| 6,346,562 B1 * | 2/2002 | Haselhorst ............. | C08L 83/04 524/148 |
| 6,706,840 B1 | 3/2004 | Williams | |
| 7,067,570 B2 * | 6/2006 | Ikeno ..................... | C08K 5/52 524/588 |
| 2004/0116561 A1 * | 6/2004 | Ikeno ..................... | C08K 5/52 524/115 |

(Continued)

FOREIGN PATENT DOCUMENTS

| | | |
|---|---|---|
| DE | 603 16 102 T2 | 6/2008 |
| EP | 2 050 768 A1 | 4/2009 |

(Continued)

OTHER PUBLICATIONS

International Search Report, issued in PCT/JP2020/026634, dated Sep. 15, 2020.

(Continued)

*Primary Examiner* — Margaret G Moore

(74) *Attorney, Agent, or Firm* — Birch, Stewart, Kolasch & Birch, LLP

(57) ABSTRACT

A one-pack type curable silicone gel composition which contains: 100 parts by mass of (A) a branched chain organopolysiloxane having a specific structure from 0.1 part by mass to 50 parts by mass of (B) a diorganopolysiloxane having both molecular chain ends blocked with diorganohydrogensiloxy groups; (C) a platinum-based catalyst; and (D) a phosphite compound represented by formula (3)

(3)

$$\begin{array}{c} R^2 \\ X \diagdown \overset{|}{\underset{|}{C}} \diagup \\ R^2 \diagup \overset{|}{\underset{|}{C}} \diagdown O \diagdown \underset{|}{P} \diagup O \diagdown \overset{|}{\underset{R^2}{C}} \diagdown X \\ O \\ | \\ R^2 \diagup \overset{|}{\underset{|}{C}} \diagdown R^2 \\ X \end{array}$$

(wherein $R^2$ represents a monovalent aliphatic hydrocarbon group having 1 to 10 carbon atoms; and X represents a hydrogen atom or a methyl group)

in such an amount that more than 3 molecules hut not more than 15 molecules of the phosphite compound represented by formula (3) are present per one platinum atom in component (C). This one-pack type curable silicone gel composition is stable in terms of characteristics and physical properties even if exposed to a temperature more than 50° C. for a long period of time.

4 Claims, No Drawings

(56) References Cited

U.S. PATENT DOCUMENTS

| | | | |
|---|---|---|---|
| 2006/0047097 A1* | 3/2006 | Tanaka | C08L 83/04 524/588 |
| 2009/0088524 A1 | 4/2009 | Koellnberger | |
| 2017/0260392 A1 | 9/2017 | Kitazawa et al. | |
| 2017/0327713 A1 | 11/2017 | Steinmann et al. | |
| 2020/0299509 A1 | 9/2020 | Hoefl et al. | |

FOREIGN PATENT DOCUMENTS

| | | |
|---|---|---|
| JP | 2849027 B2 | 1/1999 |
| JP | 2004-204225 A | 7/2004 |
| JP | 2009-220384 A | 10/2009 |
| JP | 4530147 B2 | 8/2010 |
| JP | 2016-86086 A | 5/2016 |
| JP | 2018-503709 A | 2/2018 |
| WO | WO 2016/084520 A1 | 6/2016 |
| WO | WO 2019/025001 A | 2/2019 |

OTHER PUBLICATIONS

Written Opinion of the International Searching Authority, issued in PCT/JP2020/026634, dated Sep. 15, 2020.

* cited by examiner

ONE-PACK TYPE CURABLE SILICONE GEL COMPOSITION AND CURED SILICONE GEL

TECHNICAL FIELD

This invention relates to a one-pack silicone gel composition having improved storage stability, and more particularly, to a one-pack curable silicone gel composition which maintains stable states and physical properties even when exposed to a temperature in excess of 50° C. for a long period of time, and a silicone gel cured product obtained by curing the composition.

BACKGROUND ART

Silicone gel compositions are formulated as organopolysiloxane compositions of addition reaction cure type comprising an organohydrogenpolysiloxane having a silicon-bonded hydrogen atom (i.e., SiH group), an organopolysiloxane having a silicon-bonded alkenyl group such as vinyl, and a platinum base catalyst, which cures through addition reaction of the silicon-bonded hydrogen atom to the alkenyl group. Since silicone gel cured products obtained by heating the silicone gel compositions have satisfactory heat resistance, weather resistance, oil resistance, freeze resistance, and electric insulation, a low modulus of elasticity, and a low stress, they are used for the protection of electronic parts such as vehicle mount electronic parts and consumer electronic parts. The low modulus of elasticity and low stress characteristic of the silicone gel cured products are not found in other elastomer products.

Since silicone gel compositions are cured into silicone gel cured products by heating, some problems arise, for example, such compositions of one pack type undergo state changes like viscosity buildup and gelation when exposed to high temperature, and silicone gel cured products obtained after curing undergo changes of physical properties. Solutions are taken to avoid these problems, for example, the silicone gel compositions are divided into two or more parts which are mixed immediately before use, or one-pack silicone gel compositions are transported in refrigerated or frozen state. In the former case, there is a concern that silicone gel cured products show changes of physical properties due to fluctuations of formulation and mixing. This suggests a need for very high precision formulation and mixing techniques. These materials are not universal. In the latter case, refrigerated or frozen conditions are necessary from storage to use, requiring very high costs for storage and transportation. These materials are commercially disadvantageous. Under the circumstances, the demand for one-pack silicone gel compositions which maintain states and properties unchanged during long-term storage at room temperature is now increasing.

Under the background, Patent Document 1: JP 2849027 proposes to add an amine compound of ethylene diamine skeleton. Patent Document 2: JP 4530147 proposes to use a catalyst obtained by heating and aging a specific phosphite ester compound and a platinum catalyst. The silicone gel compositions proposed in these two patent documents are surely improved in storage stability over prior art one-pack silicone gel compositions. Even these compositions undergo a viscosity buildup and gelation when exposed at a temperature in excess of 50° C. for a long period of time. Low-temperature conditions are thus essential for performance stabilization during storage and transportation.

Overseas, Patent Document 3: EP 2050768A1 and Patent Document 4: U.S. Pat. No. 6,706,840 propose to use platinum-phosphite complexes. Patent Document 5: U.S. Pat. No. 4,256,616 proposes to use a platinum-phosphite complex and a tin salt. Further, Patent Document 6: U.S. Pat. No. 4,329,275 proposes to use a platinum catalyst, a phosphorus compound, and an organic peroxide free of hydroperoxide group. The compositions proposed in these patent documents still undergo a viscosity buildup and gelation when exposed at a temperature in excess of 50° C. for a long period of time. Low-temperature conditions are thus essential for performance stabilization during storage and transportation.

Recently, Patent Document 7: DE 60316102T2 proposes a one-pack organopolysiloxane gel composition comprising a platinum catalyst, a phosphite triester, and an organic peroxide. Exemplary of the phosphite triester is tris(2,4-di-tert-butylphenyl) phosphite. The amount of the organic peroxide is at least two equivalents based on the phosphite triester. Patent Document 8: JP-A 2018-503709 proposes to use tris(2,4-di-tert-butylphenyl) phosphite. The compositions proposed in these patent documents still undergo a viscosity buildup and gelation when exposed at a temperature in excess of 50° C., for a long period of time. Low-temperature conditions are thus essential for performance stabilization during storage and transportation. There is a desire to have a silicone gel composition which eliminates the need for low-temperature storage and maintains stable states and physical properties even when exposed at a temperature in excess of 50° C. for a long period of time.

PRIOR ART DOCUMENTS

Patent Documents

Patent Document 1: JP 2849027
Patent Document 2: JP 4530147
Patent Document 3: EP 2050768A1
Patent Document 4: U.S. Pat. No. 6,706,840
Patent Document 5: U.S. Pat. No. 4,256,616
Patent Document 6: U.S. Pat. No. 4,329,275
Patent Document 7: DE 6031610272
Patent Document 8: JP-A 2018-503709

SUMMARY OF INVENTION

Technical Problem

An object of the invention, which has been made to solve the outstanding problems, is to provide a one-pack curable silicone gel composition which maintains stable states and physical properties even when exposed to a temperature in excess of 50° C. for a long period of time, and a silicone gel cured product obtained by curing the composition.

Solution to Problem

Making extensive investigations to attain the above object, the inventors have found that when a one-pack curable silicone gel composition of addition cure type adapted to cure through hydrosilylation addition reaction is constructed by selectively employing a combination of a branched organopolysiloxane of specific structure as a main component or base polymer and a straight organohydrogenpolysiloxane having silicon-bonded hydrogen atoms (i.e., SiH groups) only at both ends of the molecular chain (i.e., molecular chain both end diorganohydrogensiloxy-capped diorganopolysiloxane) as a crosslinker or curing agent, and adding and blending a conventional platinum catalyst which is commonly used in hydrosilylation addition reaction from the past and a specific phosphite triester compound having the general formula (3) in an amount of more than 3 molecules to 15 molecules per platinum atom in the platinum catalyst, the resulting one-pack curable silicone gel composition maintains stable states and physical properties even when exposed to a temperature in excess of 50° C. for a long period of time. The invention is predicated on this finding.

[Chem. 1]

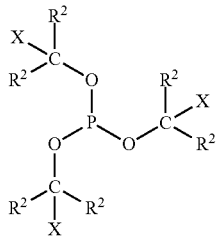

(3)

Herein $R^2$ is a $C_1$-$C_{10}$ monovalent aliphatic hydrocarbon group, and X is hydrogen or methyl.

Accordingly, the invention provides a one-pack curable silicone gel composition and a silicone gel cured product obtained by curing the composition, as defined below.

[1]

A one-pack curable silicone gel composition comprising:

(A) 100 parts by weight of a branched organopolysiloxane having the average compositional formula (1):

$$M_\alpha M^{\prime\prime}_\beta D_\gamma T_\delta \qquad (1)$$

wherein M is a unit $R^1{}_3SiO_{(1/2)}$, $M^{\prime\prime}$ is a unit $R^1{}_2RSiO_{(1/2)}$, D is a unit $R^1{}_2SiO_{(2/2)}$, T is a unit $R^1SiO_{(3/2)}$, R is independently an alkenyl group, $R^1$ is independently an unsubstituted or substituted monovalent hydrocarbon group free of aliphatic unsaturation, α is a positive number of 0.01 to 3.6, β is a positive number of 0.01 to 3.6, α+β is from 0.5 to 5, α/β is from 0.1 to 5, γ is a positive number of 10 to 1,600, δ is a positive number of 0.5 to 3, and (α+β)/δ is from 0.8 to 1.7, (B) 0.1 to 50 parts by weight of an organohydrogenpolysiloxane having the general formula (2):

[Chem. 2]

(2)

wherein $R^1$ is as defined above, and z is an integer of 1 to 500, (C) an effective amount of a platinum base catalyst, and
(D) a phosphite compound having the general formula (3):

[Chem. 3]

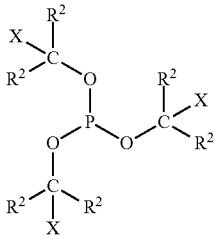

(3)

wherein $R^2$ is a $C_1$-$C_{10}$ monovalent aliphatic hydrocarbon group, and X is hydrogen or methyl, in such an amount as to provide more than 3 molecules to 15 molecules of the phosphite compound per platinum atom in component (C).

[2]

The one-pack curable silicone gel composition of [1] wherein in formula (3), $R^2$ is methyl, ethyl or propyl.

[3]

The one-pack curable silicone gel composition of [1] or [2] which cures into a silicone gel cured product having a penetration of 10 to 110 according to JIS K2220.

[4]

A silicone gel cured product obtained by curing the one-pack curable silicone gel composition of any one of [1] to [3].

Advantageous Effects of Invention

The one-pack curable silicone gel composition of the invention maintains stable states and physical properties even when exposed to a temperature in excess of 50° C. for a long period of time.

DESCRIPTION OF EMBODIMENTS

The invention provides a one-pack curable silicone gel composition comprising the following components (A) to (D) as essential components. As used herein, the term "silicone gel cured product" refers to a cured product based on an organopolysiloxane and having a low crosslinking density, specifically a penetration of 10 to 110 according to JIS K2220 (¼ cone). This corresponds to a measurement (or rubber hardness value) of 0 in measuring rubber hardness according to JIS K6253, a low hardness (i.e., soft) enough to exhibit no effective rubber hardness value, and a low stress. In this sense, the silicone gel cured product is distinguishable from the so-called silicone rubber cured product (rubbery elastomer).

Now the components are described in detail. As used herein, the viscosity is a measurement at 23° C.

[(A) Organopolysiloxane]

Component (A) used herein is a main component or base polymer in the one-pack curable silicone gel composition. Component (A) is a branched organopolysiloxane having the average compositional formula (1) shown below, containing a T unit structure to provide a branched structure (organosilsesquioxane unit represented by T in compositional formula (1)) in a specific ratio in the molecule, and having an alkenyl group bonded to a silicon atom (R in triorganosiloxy unit ($R^1_2RSiO_{1/2}$ unit) represented by $M^{Vi}$ in compositional formula (1), referred to as "silicon-bonded alkenyl group," herein) in the molecule.

$$M_\alpha M^{Vi}_\beta D_\gamma T_\delta \quad (1)$$

Herein M is a unit $R^1_3SiO_{(1/2)}$,
$M^{Vi}$ is a unit $R^1_2RSiO_{(1/2)}$,
D is a unit $R^1_2SiO_{(2/2)}$,
T is a unit $R^1SiO_{(3/2)}$,
R is independently an alkenyl group, $R^1$ is independently an unsubstituted or substituted monovalent hydrocarbon group free of aliphatic unsaturation, α is a positive number of 0.01 to 3.6, β is a positive number of 0.01 to 3.6, α+β is from 0.5 to 5, α/β is from 0.1 to 5, γ is a positive number of 10 to 1,600, δ is a positive number of 0.5 to 3, and (α+β)/δ is from 0.8 to 1.7.

In formula (1), R is independently an alkenyl group, typically of 2 to 6 carbon atoms, preferably 2 to 4 carbon atoms, more preferably 2 to 3 carbon atoms. Examples include vinyl allyl, propenyl, isopropenyl, butenyl, and isobutenyl, preferably vinyl.

$R^1$ is independently an unsubstituted or substituted monovalent hydrocarbon group free of aliphatic unsaturation, typically of 1 to 10 carbon atoms, preferably 1 to 6 carbon atoms. Examples include alkyl groups such as methyl, ethyl, propyl, isopropyl, butyl, isobutyl, tert-butyl, pentyl, hexyl, cyclohexyl, octyl and decyl; aryl groups such as phenyl and tolyl; aralkyl groups such as benzyl and phenylethyl; and substituted forms of the foregoing groups in which some or all of the hydrogen atoms are substituted by halogen atoms such as chloro, bromo or fluoro, such as chloromethyl and 3,3,3-trifluoropropyl. Inter alia, methyl, phenyl and 3,3,3-trifluoropropyl are preferred for ease of synthesis.

In formula (1), α is a positive number of 0.01 to 3.6, preferably 0.3 to 2.5, more preferably 0.5 to 2; β is a positive number of 0.01 to 3.6, preferably 0.3 to 2.5, more preferably 0.5 to 2; α+β is from 0.5 to 5, preferably from 0.6 to 4, more preferably from 0.8 to 3; and α/β is from 0.1 to 5, preferably from 0.2 to 4, more preferably from 0.5 to 2.

Further, γ is a positive number of 10 to 1,600, preferably 30 to 1,200, more preferably 50 to 1,000; δ is a positive number of 0.5 to 3, preferably 1 to 2.5, more preferably 1.2 to 2.1; and (α+β)/δ is from 0.8 to 1.7, preferably 0.85 to 1.5, more preferably 0.9 to 1.2.

If δ representative of a fraction of the branched structure (T unit) in the molecule is too large (T units are more than 3), indicating too much branched structures (crosslinking points) in the base polymer, the silicone gel composition in uncured state is prone to undergo such failures as viscosity buildup and gelation. Inversely, if δ representative of a fraction of the branched structure (T unit) is too small (T units are less than 0.5), indicating too less branched structures (crosslinking points), there is a possibility that after heating, a silicone gel cured product having a satisfactory hardness is not obtained or the composition remains uncured.

It is essential that (α+β)/δ is in a range from 0.8 to 1.7. The reason is that when (α+β), i.e., the total of non-reactive molecular chain ends (M units) and reactive molecular chain ends ($M^{Vi}$ units) is set in a specific ratio to the amount of T units providing crosslinking points (branched structures) in the base polymer, the silicone gel composition in uncured state can be provided with sufficient storage stability and sufficient curability upon unsealing and heating. If (α+β)/δ is less than 0.8, that is, the ratio of T units is too high, the silicone gel composition in uncured state is prone to undergo such failures as viscosity buildup and gelation with time during hot storage. If (α+β)/δ exceeds 1.7, that is, the ratio of T units is too low, indicating fewer crosslinking points (branched structures) in the base polymer, there is a possibility that after heating, a silicone gel cured product having a satisfactory hardness is not obtained or the composition remains uncured.

The value of γ is a positive number of 10 to 1,600, which is reflected by the viscosity of the branched organopolysiloxane as component (A). It is thus advantageous to use a base polymer having a different value of γ for a particular application or use. In consideration of the viscosity of component (A) used in a broad range, γ is preferably a positive number of 30 to 1,200, more preferably 50 to 1,000.

Component (A) should preferably have a viscosity of 10 to 50,000 mPa·s, more preferably 100 to 10,000 mPa·s. If the viscosity of component (A) is too low, the resulting one-pack curable silicone gel composition may accordingly have a low viscosity which is detrimental to work, and the resulting silicone gel cured product may become too hard. If the viscosity of component (A) is too high, the resulting one-pack curable silicone gel composition may accordingly have a high viscosity which gives an adverse impact on working.

It is noted that the viscosity can be measured by a rotational viscometer such as BL, BH, BS, cone plate type viscometer or rheometer (the same holds true, hereinafter).

Also, the degree of polymerization (e.g., the sum of α+β+γ+δ in compositional formula (1), or the value of z in average formula (2) representative of component (B) to be described later) or molecular weight is typically determined as a number average degree of polymerization or number average molecular weight by gel permeation chromatography (GPC) versus polystyrene standards using toluene or the like as eluent.

Component (A) or organopolysiloxane may be used alone or in admixture or two or more as long as they fall within the range of formula (1).

[(B) Organohydrogenpolysiloxane Having Silicon-Bonded Hydrogen Atoms Only at Both Ends of the Molecular Chain]

Component (B) used herein acts as a curing agent or crosslinker for forming a crosslinking structure through hydrosilylation addition reaction of silicon-bonded hydrogen in component (B) with silicon-bonded alkenyl group in component (A). Component (B) is a straight organohydrogenpolysiloxane having silicon-bonded hydrogen atoms (i.e., SiH groups) only at both ends of the molecular chain, represented by the general formula (2):

[Chem. 4]

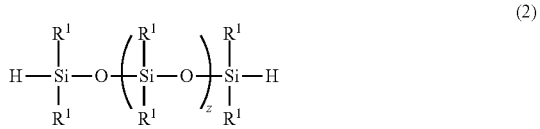

(2)

wherein $R^1$ is as defined above, and z is an integer of 1 to 500,
that is, molecular chain both end diorganohydrogensiloxy-capped diorganopolysiloxane.

In formula (2), $R^1$ is as defined and exemplified above for $R^1$ in formula (1). Inter alia, methyl, phenyl and 3,3,3trifluoropropyl are preferred.

It is necessary that z representative of the repetition number of difunctional diorganosiloxane units ($Si(R^1)_2O_{2/2}$)

in the molecule or degree of polymerization be an integer of 1 to 500, preferably 5 to 300. If z is less than 1, there is a risk that component (B) or organohydrogenpolysiloxane has a low viscosity which is detrimental to working or the resulting silicone gel cured product becomes too hard. If z exceeds 500, component (B) or organohydrogenpolysiloxane has a high viscosity which gives an adverse impact on working.

Component (B) should preferably have a viscosity of 0.1 to 1,000 mPa·s, more preferably 1 to 500 mPa·s. If the viscosity of component (B) is too low, the resulting one-pack curable silicone gel composition may accordingly have a low viscosity which is detrimental to work, and the resulting silicone gel cured product may become too hard. If the viscosity of component (B) is too high, the resulting one-pack curable silicone gel composition may accordingly have a high viscosity which gives an adverse impact on working.

Component (B) or organohydrogenpolysiloxane may be used alone or in combination of two or more compounds having different values of z.

The amount of component (B) added is 0.1 to 50 parts by weight, preferably 3 to 30 parts by weight per 100 parts by weight of component (A) or organopolysiloxane. With less than 0.1 part by weight, there is a risk that the resulting silicone gel cured product becomes too soft and at the worst, no cured product is obtained. With more than 50 parts by weight, there is a risk that the desired cold-temperature performance is not available and the resulting silicone gel cured product is hard.

[(C) Platinum Base Catalyst]

Component (C) used herein is a catalyst which is commonly used in the art for promoting hydrosilylation addition reaction of silicon-bonded alkenyl group in component (A) to silicon-bonded hydrogen (SiH group) in component (B). Component (C) is such that when it is mixed with component (D) or phosphite compound to be described later during storage of the one-pack curable silicone gel composition at room temperature (23° C.±15° C.), a platinum-phosphite complex is readily formed in a quantitative manner. The formation of platinum-phosphite complex ensures that the one-pack curable silicone gel composition maintains stable states and physical properties even when exposed to a temperature in excess of 50° C. for a long period of time.

Component (C) is a platinum base catalyst (platinum or platinum base compound) which may be selected from well-known ones. Examples include platinum black, chloroplatinic acid, alcohol-modified chloroplatinic acids, and complexes of chloroplatinic acid with olefins, aldehydes, vinylsiloxanes or acetylene alcohols.

The amount of component (C) blended is an effective amount and may be appropriately increased or decreased depending on the desired cure speed. The amount is typically 0.1 to 1,000 ppm, preferably 1 to 300 ppm by weight of platinum atom based on the total of components (A) and (B). If the amount is too large, the cured product may have poor heat resistance.

[(D) Phosphite Compound]

Component (D) or phosphite compound acts such that during storage of the one-pack curable silicone gel composition at room temperature (23° C.±15° C.), the phosphite compound forms a platinum-phosphite complex with the platinum base catalyst as component (C), which ensures that the one-pack curable silicone gel composition maintains stable states and physical properties even when exposed to a temperature in excess of 50° C. for a long period of time. The phosphite compound is essential for this purpose. The phosphite compound should have the structure of the general formula (3):

[Chem. 5]

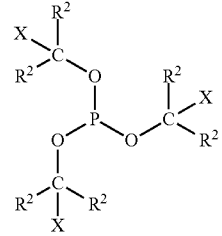

(3)

wherein $R^2$ is a $C_1$-$C_{10}$ monovalent aliphatic hydrocarbon group, and X is hydrogen or methyl.

In formula (3), $R^2$ is a $C_1$-$C_{10}$, preferably $C_1$-$C_6$ monovalent aliphatic hydrocarbon group, examples of which include alkyl groups such as methyl, ethyl, propyl, isopropyl, butyl, isobutyl, tert-butyl, pentyl, hexyl, cyclohexyl, octyl and decyl, and alkenyl groups such as vinyl, allyl, propenyl, isopropenyl, butenyl and isobutenyl, with monovalent hydrocarbon groups free of aliphatic unsaturation being desirable. Inter alia, alkyl groups are preferred, with methyl, ethyl and propyl being more preferred. $R^1$ may be the same or different.

X should be hydrogen or methyl, with hydrogen being preferred.

Examples of the phosphite compound having formula (3) include triisopropyl phosphite, tri(tert-butyl) phosphite, tri (sec-butyl) phosphite, tris(1-ethylpropyl) phosphite, tris(1-ethylbutyl) phosphite, and tris(1-propylbutyl) phosphite.

The phosphite compound is blended in such an amount as to provide more than 3 molecules to 15 molecules of the phosphite compound having formula (3) per platinum atom in component (C). If the phosphite compound having formula (3) is not more than 3 molecules per platinum atom, the activity of the platinum catalyst cannot be fully reduced so that the silicone gel composition may undergo a viscosity buildup or gelation when exposed to high temperature for a long period of time. If the phosphite compound having formula (3) is more than 15 molecules per platinum atom, there is a risk arising from the excess of the phosphite compound that when heated for curing, the composition does not cure to a full extent or it takes a long time for the composition to cure, and at the worst, a cured product is not obtained. The amount of the phosphite compound blended is preferably in the range of 3.5 molecules to 12 molecules of the phosphite compound per platinum atom in component (C), more preferably in the range of 4 molecules to 10 molecules of the phosphite compound per platinum atom in component (C).

Component (D) array be added after previous mixing with component (C), or added alone.

[Optional Components]

Besides the foregoing components (A) to (D), the one-pack curable silicone gel composition of the invention may comprise optional components as long as the objects of the invention are not compromised. Suitable optional components include, for example, reaction inhibitors, inorganic fillers, reaction promoters, organopolysiloxanes free of silicon-bonded hydrogen and silicon-bonded alkenyl group, heat resistance improvers, flame retardants, thixotropic agents, pigments, dyes, etc.

The reaction inhibitor is a component for controlling the reaction of the silicone gel composition. Examples thereof include acetylene, amine, carboxylate base reaction inhibitors.

Examples of the inorganic tiller include inorganic fillers such as fumed silica, crystalline silica, precipitated silica, hollow fillers, silsesquioxane, turned titanium dioxide, magnesium oxide, zinc oxide, iron oxide, aluminum hydroxide, magnesium carbonate, calcium carbonate, zinc carbonate, laminar mica, carbon black, diatomaceous earth, and glass fibers; and the foregoing fillers which have been surface treated to be hydrophobic with organosilicon compounds such as organoalkoxysilane compounds, organochlorosilane compounds, organosilazane compounds, and low-molecular-weight siloxane compounds. Silicone rubber powder, silicone resin powder and similar powder may also be blended.

When it is desired to cure the composition at lower temperature, a minor amount of an organic peroxide may be added as reaction promoter. Examples of the organic peroxide include di-tert-butyl peroxide and di-tert-hexyl peroxide. Since this causes a loss of state stability under high-temperature conditions, it is preferable to use a minor amount of an antioxidant in combination. Examples of the antioxidant used herein include dibutylhydroxytoluene and butylhydroxyanisole.

[Curing of Composition]

By curing the one-pack curable silicone gel composition of the invention under suitable temperature conditions for a particular application, a silicone gel cured product is obtained. The heating temperature is preferably in the range of 100 to 180° C., more preferably 100 to 160° C. The heating time is preferably in the range of about 10 minutes to about 5 hours, more preferably about 20 minutes to about 2 hours.

The one-pack curable silicone gel composition is advantageously used to encapsulate or fill electric/electronic parts.

The cured product of the one-pack curable silicone gel composition preferably has a penetration of 10 to 110, more preferably 10 to 100, and even more preferably 15 to 90, as measured according to JIS K2220 using a ¼ cone. If the penetration is less than 10, the electronic circuit may fail to withstand the stress induced upon curing of the silicone gel composition and be broken in part or the silicone gel cured product may crack inside. If the penetration exceeds 110, the silicone gel cured product may spall or fall off due to vibration.

The one-pack curable silicone gel composition as defined above maintains stable states and physical properties even when exposed to a temperature in excess of 50° C. for a long period of time. That is, when the one-pack curable silicone gel composition is held or stored at 70° C. for 30 days, it maintains the liquid state without gelling, its viscosity within 2 times the initial value, preferably within 1.1 times the initial value, and its curability (especially deep section cure) unchanged from the initial. Further, when the one-pack curable silicone gel composition is held or stored at 70° C. for 30 days, its cured product (silicone gel cured product) maintains physical properties substantially unchanged from the initial. Specifically, the cured product of the one-pack curable silicone gel composition after storage at 70° C. for 30 days has a penetration of 10 to 110, as measured according to JIS K2220 using a ¼ cone, which is maintained within ±5 points, preferably within ±2 points from the initial penetration.

EXAMPLES

Synthesis Examples, Examples and Comparative Examples are given below for illustrating the invention, but the invention is not limited thereto. In Examples, parts and % are by weight. Vi stands for vinyl. The penetration is measured according to JIS K2220 with a ¼ cone, using an automatic penetrometer RPM-101 by Rigo Co., Ltd. The viscosity is measured at 23° C. by a rotational viscometer. The degree of polymerization is a number average degree of polymerization as analyzed by GPC versus polystyrene standards using toluene as eluent.

Example 1

Composition 1 was obtained by combining 100 parts of component (A): an organopolysiloxane represented by the average compositional formula (4):

$$M_{1.21}M^{Vi}_{0.88}D_{97.7}T_{2.0} \qquad (4)$$

wherein $M=(CH_3)_3SiO_{1/2}$,
$M^{Vi}=(CH_3)_2(CH_2=CH)SiO_{1/2}$,
$D=(CH_3)_2SiO_{2/2}$,
$T=(CH_3)SiO_{3/2}$,
$\delta=2.0$, $\alpha=1.21$, $\beta=0.88$, $\gamma=97.7$, $\alpha+\beta=2.09$, $\alpha/\beta=1.375$, $(\alpha+\beta)/\delta=1.045$, and having a viscosity at 23° C. of 800 mPa·s and 9.0 parts of component (B): a both end dimethylhydrogensiloxy-capped dimethylpolysiloxane represented by the general formula (5):

[Chem. 6]

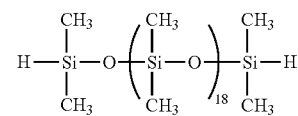

(5)

and having a viscosity at 23° C. of 18 mPa·s, agitating them until uniform, adding 0.20 part of component (C): a dimethylpolysiloxane solution of chloroplatinic acid-vinylsiloxane complex containing 0.5 wt % of platinum atom, 0.00534 part (to provide 5.0 molecules per platinum atom in component (C)) of component (D): a phosphite triester compound having the general formula (6):

[Chem. 7]

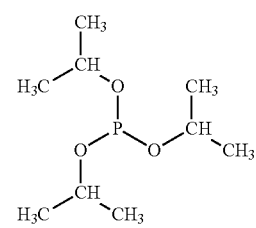

(6)

(trade name: triisopropyl phosphite by Tokyo Chemical Industry Co., Ltd.), and 0.04 part of an optional component:

ethynyl cyclohexanol, and mixing them until uniform. The resulting Composition 1 was heat cured at 150° C. for 30 minutes, yielding a cured product having a penetration of 45.

Example 2

Composition 2 was obtained by combining 100 parts of component (A): an organopolysiloxane represented by the average compositional formula (7):

wherein $M=(CH_3)_3SiO_{1/2}$,
$M^{Vi}=(CH_3)_2(CH_2=CH)SiO_{1/2}$,
$D=(CH_3)_2SiO_{2/2}$,
$D^{\Phi}=(C_6H_5)_2SiO_{2/2}$,
$T=(CH_3)SiO_{3/2}$,
$\delta=1.5$, $\alpha=0.83$, $\beta=0.84$, $\gamma=100.4$, $\alpha+\beta=1.67$, $\alpha/\beta=0.988$, $(\alpha+\beta)/\delta=1.11$, and having a viscosity at 23° C. of 1,000 mPa·s and 8.70 parts of component (B): a both end dimethylhydrogensiloxy-capped dimethylpolysiloxane represented by the general formula (5):

[Chem. 8]

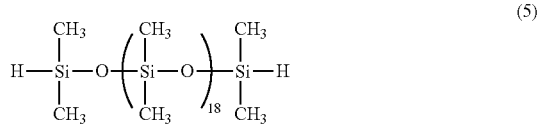

and having a viscosity at 23° C. of 18 mPa·s, agitating them until uniform, adding 0.20 part of component (C): a dimethylpolysiloxane solution of chloroplatinic acid-vinylsiloxane complex containing 0.5 wt % of platinum atom, 0.00855 part (to provide 8.0 molecules per platinum atom in component (C)) of component (D): a phosphite triester compound having the general formula (6):

[Chem. 9]

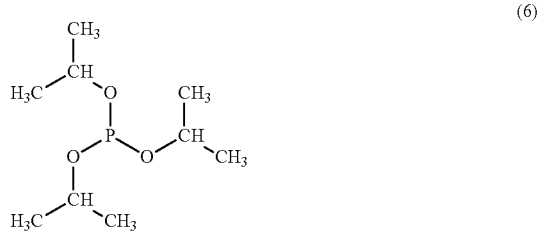

(trade name: triisopropyl phosphite by Tokyo Chemical Industry Co., Ltd.), and 0.04 part of an optional component: ethynyl cyclohexanol and mixing them until uniform. The resulting Composition 2 was heat cured at 150° C. for 30 minutes, yielding a cured product having a penetration of 48.

Example 3

Composition 3 was obtained by combining 100 parts of component (A): an organopolysiloxane represented by the average compositional formula (4):

wherein $M=(CH_3)_3SiO_{1/2}$,
$M^{Vi}=(CH_3)_2(CH_2=CH)SiO_{1/2}$,
$D=(CH_3)_2SiO_{2/2}$,
$T=(CH_3)SiO_{3/2}$,
$\delta=2.0$, $\alpha=1.21$, $\beta=0.88$, $\gamma=97.7$, $\alpha+\beta=2.09$, $\alpha/\beta=1.375$, $(\alpha+\beta)/\delta=1.045$, and having a viscosity at 23° C. of 800 mPa·s and 17.0 parts of component (B): a both end dimethylhydrogensiloxy-capped dimethylpolysiloxane represented by the general formula (8):

[Chem. 10]

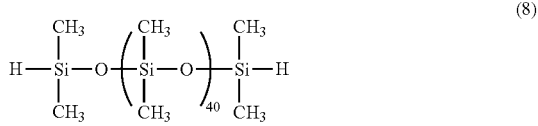

and having a viscosity at 23° C. of 36 mPa·s, agitating them until uniform, adding 0.20 part of component (C): a dimethylpolysiloxane solution of chloroplatinic acid-vinylsiloxane complex containing 0.5 wt % of platinum atom, 0.00534 part (to provide 5.0 molecules per platinum atom in component (C)) of component (D): a phosphite triester compound having the general formula (6):

[Chem. 11]

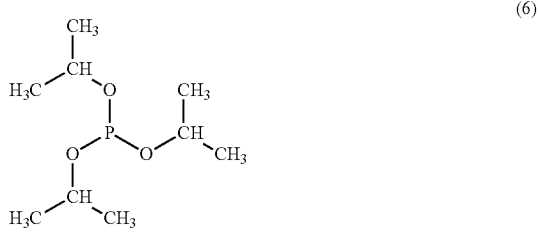

(trade name: triisopropyl phosphite by Tokyo Chemical Industry Co., Ltd.), and 0.04 part of an optional component: ethynyl cyclohexanol, and mixing them until uniform. The resulting Composition 3 was heat cured at 150° C. for 30 minutes, yielding a cured product having a penetration of 47.

Example 4

Composition 4 was obtained by combining 100 parts of component (A): an organopolysiloxane represented by the average compositional formula (4):

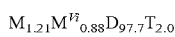

wherein $M=(CH_3)_3SiO_{1/2}$,
$M^{Vi}=(CH_3)_2(CH_2=CH)SiO_{1/2}$,
$D=(CH_3)_2SiO_{2/2}$,
$T=(CH_3)SiO_{3/2}$,
$\delta=2.0$, $\alpha=1.21$, $\beta=0.88$, $\gamma=97.7$, $\alpha+\beta=2.09$, $\alpha/\beta=1.375$, $(\alpha+\beta)/\delta=1.045$, and having a viscosity at 23° C. of 800 mPa·s and 9.0 parts of component (B): a both end dimethylhydrogensiloxy-capped dimethylpolysiloxane represented by the general formula (5):

[Chem. 12]

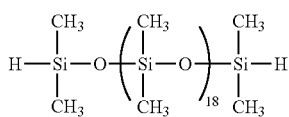

(5)

and having a viscosity at 23° C. of 18 mPa·s, agitating them until uniform, adding 0.20 part of component (C): a dimethylpolysiloxane solution of chloroplatinic acid-vinylsiloxane complex containing 0.5 wt % of platinum atom, 0.00641 part (to provide 5.0 molecules per platinum atom in component (C)) of component (D): a phosphite triester compound having the general formula (9):

[Chem. 13]

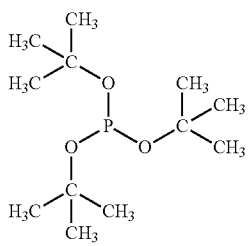

(9)

and 0.04 part of an optional component: ethynyl cyclohexanol, and mixing them until uniform. The resulting Composition 4 was heat cured at 150° C. for 30 minutes, yielding a cured product having a penetration of 45.

Example 5

Composition 5 was obtained by combining 100 parts of component (A): an organopolysiloxane represented by the average compositional formula (4):

$$M_{1.21}M^{Vi}_{0.88}D_{97.7}T_{2.0} \quad (4)$$

wherein $M=(CH_3)_3SiO_{1/2}$,
$M^{Vi}=(CH_3)_2(CH_2=CH)SiO_{1/2}$,
$D=(CH_3)_2SiO_{2/2}$,
$T=(CH_3)SiO_{3/2}$,
$\delta=2.0$, $\alpha=1.21$, $\beta=0.88$, $\gamma=97.7$, $\alpha+\beta=2.09$, $\alpha/\beta=1.375$, $(\alpha+\beta)/\delta=1.045$, and having a viscosity at 23° C. of 800 mPa·s and 9.0 parts of component (B): a both end dimethylhydrogensiloxy-capped dimethylpolysiloxane represented by the general formula (5):

[Chem. 14]

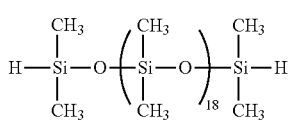

(5)

and having a viscosity at 23° C. of 18 mPa·s, agitating them until uniform, adding 0.20 part of component (C): a dimethylpolysiloxane solution of chloroplatinic acid-vinylsiloxane complex containing 0.5 wt % of platinum atom, 0.0107 part (to provide 10.0 molecules per platinum atom in component (C)) of component (D): a phosphite triester compound having the general formula (6):

[Chem. 15]

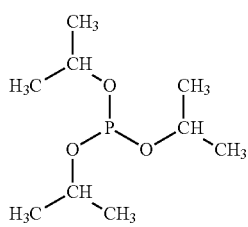

(6)

(trade name: triisopropyl phosphite by Tokyo Chemical industry Co., Ltd.), and 0.04 part of an optional component: ethynyl cyclohexanol, and mixing them until uniform. The resulting Composition 5 was heat cured at 150° C. for 30 minutes, yielding a cured product having a penetration of 46.

Comparative Example 1

Composition 6 was prepared by the same procedure as in Example 1 aside from using 100 parts of a base polymer having the average compositional formula (4), but free of T structure, that is, an organopolysiloxane represented by the average compositional formula (10):

$$M_{1.21}M^{Vi}_{0.88}D_{97.7} \quad (10)$$

wherein $M=(CH_3)_3SiO_{1/2}$,
$M^{Vi}=(CH_3)_2(CH_2=CH)SiO_{1/2}$,
$D=(CH_3)_2SiO_{2/2}$,
$\alpha=1.21$, $\beta=0.88$, $\gamma=97.7$, $\delta=0$, $\alpha+\beta=2.09$, $\alpha/\beta=1.375$, and having a viscosity at 23° C. of 600 mPa·s as component (A). After Composition 6 was heated at 150° C. for 30 minutes, the composition remained uncured with a viscosity buildup being observed.

Comparative Example 2

Composition 7 was prepared by the same procedure as in Example 1 aside from using 100 parts of a base polymer having the average compositional formula (4) containing 4.0 of T structure, that is, an organopolysiloxane represented by the average compositional formula (11):

$$M_{1.21}M^{Vi}_{0.88}D_{97.7}T_{4.0} \quad (11)$$

wherein $M=(CH_3)_3SiO_{1/2}$,
$M^{Vi}=(CH_3)_2(CH_2=CH)SiO_{1/2}$,
$D=(CH_3)_2SiO_{2/2}$,
$T=(CH_3)SiO_{3/2}$,
$\alpha=1.21$, $\beta=0.88$, $\gamma=97.7$, $\delta=4.0$, $\alpha+\beta=2.09$, $\alpha/\beta=1.375$, $(\alpha+\beta)/\delta=0.52$, outside the scope of the invention, and having a viscosity at 23° C. of 800 mPa·s as component (A). This Composition 7 was heat cured at 150° C. for 30 minutes, yielding a cured product having a penetration of 20.

Comparative Example 3

Composition 8 was prepared by the same procedure as in Example 1 aside from using 100 parts of a base polymer having the average compositional formula (4) containing 0.3 of T structure, that is, an organopolysiloxane represented by the average compositional formula (12):

$$M_{1.21}M^{Vi}_{0.88}D_{97.7}T_{0.3} \quad (12)$$

wherein $M=(CH_3)_3SiO_{1/2}$,
$M^{Vi}=(CH_3)_2(CH_2=CH)SiO_{1/2}$,
$D=(CH_3)_2SiO_{2/2}$,
$T=(CH_3)SiO_{3/2}$,
$\alpha=1.21$, $\beta=0.88$, $\gamma=97.7$, $\delta=0.3$, $\alpha+\beta=2.09$, $\alpha/\beta=1.375$, $(\alpha+\beta)/\delta=6.97$, outside the scope of the invention, and
having a viscosity at 23° C. of 550 mPa·s as component (A).
This Composition 8 was heat cured at 150° C. for 30 minutes into a silicone gel cured product, which was too soft to measure a penetration.

Comparative Example 4

Composition 9 was prepared by the same procedure as in Example 1 aside from using 100 parts of a base polymer having the average compositional formula (4) wherein $\alpha=0$, that is, an organopolysiloxane represented by the average compositional formula (13):

$$M^{Vi}_{0.88}D_{97.7}T_{2.0} \quad (13)$$

wherein $M^{Vi}=(CH_3)_2(CH_2=CH)SiO_{1/2}$,
$D=(CH_3)_2SiO_{2/2}$,
$T=(CH_3)SiO_{3/2}$,
$\alpha=0$, $\beta=0.88$, $\gamma=97.7$, $\delta=2.0$, $\alpha+\beta=0.88$, $\alpha/\beta=0$, $(\alpha+\beta)/\delta=0.44$, outside the scope of the invention, and
having a viscosity at 23° C. of 700 mPa·s as component (A).
This Composition 9 was heat cured at 150° C. for 30 minutes into a silicone gel cured product, which was too hard and had a penetration of 2.

Comparative Example 5

Composition 10 was prepared by the same procedure as in Example 1 aside from using 2.1 parts of a both end trimethylsiloxy-capped dimethylsiloxane/methylhydrogensiloxane copolymer represented by the general formula (14):

[Chem. 16]

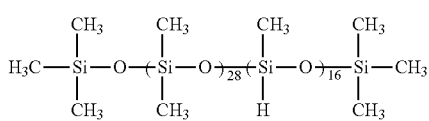

(14)

and having a viscosity at 23° C. of 100 mPa·s as component (B) instead of the both end dimethylhydrogensiloxy-capped dimethylpolysiloxane represented by the general formula (5) and having a viscosity at 23° C. of 18 mPa·s. This Composition 10 was heat cured at 150° C. for 30 minutes, yielding a cured product having a penetration of 42.

Comparative Example 6

Composition 11 was prepared by the same procedure as in Example 1 aside from using 0.01658 part (to provide 5.0 molecules per platinum atom) of tris(2,4-tert-butylphenyl) phosphite as component (D) instead of triisopropyl phosphite. This Composition 11 was heat cured at 150° C. for 30 minutes. Only the surface section was cured whereas the deep section remained uncured. A penetration of 60 was measured.

Comparative Example 7

Composition 12 was prepared by the same procedure as in Example 1 aside from using 0.00213 part (to provide 2.0 molecules per platinum atom) of triisopropyl phosphite as component (D). This Composition 12 was heat cured at 150° C. for 30 minutes, yielding a cured product having a penetration of 45.

Comparative Example 8

Composition 13 was prepared by the same procedure as in Example 1 aside from using 0.02136 part (to provide 20.0 molecules per platinum atom) of triisopropyl phosphite as component (D). This Composition 13 was heat cured at 150° C. for 30 minutes. Only the surface section was cured whereas the deep section remained uncured. A penetration of 55 was measured.

[Tests]

The following tests were conducted on the compositions of Examples 1 to 5 and Comparative Examples 1 to 8. The results are shown in Tables 1 and 2.
Evaluation of Initial Physical Properties:
Penetration The hardness of the cured products obtained in Examples and Comparative Examples was evaluated by measuring a penetration. The penetration was measured according to JIS K2220 with a ¼ cone, using an automatic penetrometer RPM-101 by Rigo Co., Ltd.
Viscosity In Examples and Comparative Examples, the viscosity was measured at a temperature of 23° C. by a rotational viscometer.
Deep Section Cure Each of the compositions obtained in Examples and Comparative Examples was placed in a cylinder (diameter 30 mm by 15 mm) where it was cured at 150° C. for 30 minutes. The silicone gel cured product was taken out and examined whether it was cured to the deep section. A sample which cured to a depth of 15 mm (to the bottom) was judged "Pass" whereas a sample having a liquid deep section was judged "Reject."
Evaluation of Hot Storage Stability
70° C. Storage A glass container with a volume of 120 mL was charged with 100 g of the composition. The space was purged with nitrogen before the container was closed. The charged container was placed in a dryer at 70° C. where it was stored for 30 days. The container space was purged with nitrogen such that the concentration of oxygen in the space was computed to be up to 50 ppm. After the storage, the state of the composition was visually observed. A sample which remained liquid was rated "Pass."
Penetration After 70° C./30 Days In the above 70° C. storage test, a composition which remained liquid after storage at 70° C. for 30 days was heat cured at 150° C. for 30 minutes into a cured product, which was measured for penetration as above. A sample whose penetration was within ±5 points from the penetration of initial preparation was judged "Pass" whereas a sample whose penetration was below −5 points, beyond 4-5 points or unmeasurable was judged "Reject."
Viscosity After 70° C./30 Days In the above 70° C. storage test, a composition which remained liquid after storage at 70° C. tier 30 days was measured for viscosity at a temperature of 23° C. by a rotational viscometer. The measured value was compared with the initial value. A sample whose viscosity was within 2 times the initial value was judged "Pass" whereas a sample whose viscosity was above 2 times the initial value was judged "Reject" with respect to storage stability.

Deep Section Cure After 70° C./30 Days

In the above 70° C. storage test, a composition which remained liquid after storage at 70° C. tier 30 days was measured and evaluated for deep section cure as above.

in its structure, that is, a base oil in which monofunctional siloxy units constituting the molecular chain terminus consist of addition curable $M^{Vi}$ units, so that too many crosslinking points are available. The initial penetration is below 5, i.e., a level below which the measurement accuracy is regarded questionable. In addition, the composition gelled on about 18 days of 70° C. storage. In Comparative Example 5, the organohydrogenpolysiloxane as component (B) has a

TABLE 1

|  |  | Example |  |  |  |  |
| --- | --- | --- | --- | --- | --- | --- |
|  |  | 1 | 2 | 3 | 4 | 5 |
| Initial physical properties | Penetration with ¼ cone | 45 | 48 | 47 | 45 | 46 |
|  | Viscosity (Pa · s) | 630 | 760 | 650 | 640 | 550 |
|  | Deep section cure | Pass | Pass | Pass | Pass | Pass |
| Hot storage stability | 70° C. storage | liquid@ 30 days Pass | liquid@ 30 days Pass | liquid@ 30 days Pass | liquid@ 30 days Pass | liquid@ 30 days Pass |
|  | Penetration with ¼ cone after 70° C./30 days | 45 Pass | 49 Pass | 47 Pass | 44 Pass | 46 Pass |
|  | Viscosity (Pa · s) after 70° C./30 days | 630 | 750 | 660 | 640 | 550 |
|  | Deep section cure after 70° C./30 days | Pass | Pass | Pass | Pass | Pass |
| Comparison | (Viscosity @70° C./ 30 days)/(initial viscosity) | 1.00 Pass | 0.99 Pass | 1.02 Pass | 1.00 Pass | 1.00 Pass |

TABLE 2

|  |  | Comparative Example |  |  |  |  |  |  |  |
| --- | --- | --- | --- | --- | --- | --- | --- | --- | --- |
|  |  | 1 | 2 | 3 | 4 | 5 | 6 | 7 | 8 |
| Initial physical properties | Penetration with ¼ cone | uncured | 20 | unmeasurable | 2 | 42 | 60 | 45 | 55 |
|  | Viscosity (P · s) | 600 | 900 | 650 | 660 | 620 | 670 | 630 | 550 |
|  | Deep section cure | Reject | Pass | Pass | Pass | Pass | Reject | Pass | Reject |
| Hot storage stability | 70° C. storage | liquid@ 30 days Pass | gelled@ 14 days Reject | liquid@ 30 days Pass | gelled@ 18 days Reject | gelled@ 15 days Reject | gelled@ 8 days Reject | gelled@ 1 day Reject | liquid@ 30 days Pass |
|  | Penetration with ¼ cone after 70° C./30 days | uncured | — | unmeasurable | — | — | — | — | 49 Reject |
|  | Viscosity (Pa · s) after 70° C./30 days | 600 | — | 650 | — | — | — | — | 550 |
|  | Deep section cure. after 70° C./30 days | Pass | — | Pass | — | — | — | — | Reject |
| Comparison | (Viscosity @70° C./ 30 days)/(initial viscosity) | 1.00 Pass | — | 1.00 Pass | — | — | — | — | 1.00 Pass |

[Evaluation]

The compositions of Examples 1 to 5 meet the requirements of the invention. Those samples stored at 70° C. for 30 days maintain unchanged the physical properties and states at the initial of preparation, proving that the compositions have excellent storage stability.

In contrast, the composition of Comparative Example 1 remained uncured with only a viscosity buildup when it was heated at 150° C., because the organopolysiloxane as component (A) does not contain T units in its structure so that no crosslinking points are available. In Comparative Examples 2 and 3, the number of T units in the organopolysiloxane structure as component (A) is outside the scope of the invention. Because of the excessive number of T units, the composition of Comparative Example 2 gelled during storage at 70° C. Inversely because of the least number of T units, the composition of Comparative Example 3 cured, but failed to form a silicone gel cured product having a sufficient hardness to measure a penetration. In Comparative Example 4, component (A) is an organopolysiloxane not containing α different structure, i.e., has SiH groups only on side chains. In this case too, the composition gelled on about 15 days of 70° C. storage. Comparative Example 6 uses a phosphite compound having a different structure from the inventive component (D). It is demonstrated that the composition using such a phosphite compound is not cured to the bottom of the cylinder (diameter 30 mm by 15 mm) under the curing conditions: 150° C. and 30 minutes. In addition, the composition gelled on about 8 days of 70° C. storage. In Comparative Examples 7 and 8, the amount of the phosphite compound added as component (D) is outside the scope of the invention. The composition of Comparative Example 7 wherein the amount of phosphite ester added is so small as to provide 2.0 molecules per platinum atom gelled on about 1 day of 70° C. storage. Inversely, the composition of Comparative Example 8 wherein the amount of phosphite ester added is so large as to provide 20.0 molecules per platinum atom was unsatisfactory in deep section cure.

These results prove the effectiveness of the invention.

INDUSTRIAL APPLICABILITY

The one-pack curable silicone gel composition of the invention has storage stability, eliminates a need for mixing because of one-pack type, is fully robust with respect to environmental changes during transportation and storage, and offers a heat curable material which is beneficial to users and quite advantageous in transportation and long-term storage. It is also a material with no changes of physical properties over a long term and is beneficial to users. It is thus regarded as a material capable of reducing the costs of refrigeration and transportation and saving trouble in storage.

The invention claimed is:

1. A one-pack curable silicone gel composition comprising:
   (A) 100 parts by weight of a branched organopolysiloxane leaving the average compositional formula (1):

$$M_\alpha M^{Vi}_\beta D_\gamma T_\delta \quad (1)$$

wherein M is a unit $R^1_3SiO_{(1/2)}$,
   $M^{Vi}$ is a unit $R^1_2RSiO_{(1/2)}$,
   D is a unit $R^1_2SiO_{(2/2)}$,
   T is a unit $R^1SiO_{(3/2)}$,
   R is independently an alkenyl group, $R^1$ is independently an unsubstituted or substituted monovalent hydrocarbon group free of aliphatic unsaturation, $\alpha$ is a positive number of 0.01 to 3,6, $\beta$ is a positive number of 0.01 to 3.6, $\alpha+\beta$ is from 0.5 to 5, $\alpha/\beta$ is from 0.1 to 5, $\gamma$ is a positive number of 10 to 1,600, $\delta$ is a positive number of 0.5 to 3, and $(\alpha+\beta)/\delta$ is from 0.8 to 1.7,
   (B) 0.1 to 50 parts by weight of an organohydrogenpolysiloxane having the general formula (2):

[Chem. 1]

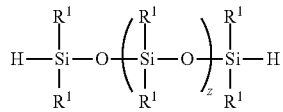
   (2)

wherein $R^1$ is as defined above, and z is an integer of 1 to 500,
   (C) an effective amount of a platinum base catalyst, and
   (D) a phosphite compound having the general formula (3):

[Chem. 2]

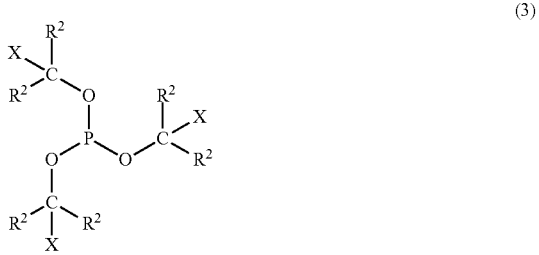
   (3)

wherein $R^2$ is a $C_1$-$C_{10}$ monovalent aliphatic hydrocarbon group, and X is hydrogen or methyl, in such an amount as to provide more than 3 molecules to 15 molecules of the phosphite compound per platinum atom in component (C).

2. The one-pack curable silicone gel composition of claim 1 wherein in formula (3), $R^2$ is methyl, ethyl or propyl.

3. The one-pack curable silicone gel composition of claim 1 which cures into a silicone gel cured product having a penetration of 10 to 110 according to HS K2220.

4. A silicone gel cured product obtained by curing the one-pack curable silicone gel composition of claim 1.

* * * * *